United States Patent
Huang et al.

(10) Patent No.: US 9,519,103 B2
(45) Date of Patent: Dec. 13, 2016

(54) ATHERMAL ARRAYED WAVEGUIDE GRATING WAVELENGTH DIVISION MULTIPLEXER

(71) Applicant: Zhuhai FTZ Oplink Communications, Inc., Zhuhai (CN)

(72) Inventors: Taizhong Huang, Maoming (CN); Xiaoyuan Liu, Linyi (CN); Hai Zhang, Xinyang (CN); Senming Gong, Zhuhai (CN); Anmin Zhang, Zhongshan (CN)

(73) Assignee: Zhuhai FTZ Oplink Communications, Inc., Zhuhai (CN)

( * ) Notice: Subject to any disclaimer, the term of this patent is extended or adjusted under 35 U.S.C. 154(b) by 0 days.

(21) Appl. No.: 14/595,486

(22) Filed: Jan. 13, 2015

(65) Prior Publication Data

US 2015/0309257 A1    Oct. 29, 2015

(30) Foreign Application Priority Data

Apr. 25, 2014  (CN) .......................... 2014 1 0172570

(51) Int. Cl.
  *G02B 6/12*   (2006.01)
  *G02B 6/26*   (2006.01)
  *G02B 6/42*   (2006.01)

(52) U.S. Cl.
  CPC ....... *G02B 6/12009* (2013.01); *G02B 6/12026* (2013.01)

(58) Field of Classification Search
  CPC ..................... G02B 6/12014; G02B 6/12026
  USPC .......................................... 385/14, 17, 37, 46
  See application file for complete search history.

(56) References Cited

U.S. PATENT DOCUMENTS

| | | | | |
|---|---|---|---|---|
| 6,738,545 B1* | 5/2004 | Purchase | ............ | G02B 6/12011 385/14 |
| 6,798,948 B2* | 9/2004 | Delisle | ............... | G02B 6/12004 385/33 |
| 6,975,793 B2* | 12/2005 | Cole | .................... | G02B 6/1203 385/14 |
| 7,397,986 B2* | 7/2008 | Bulthuis | ............ | G02B 6/12014 385/37 |
| 7,539,368 B2* | 5/2009 | Hasegawa | .......... | G02B 6/12014 385/14 |
| 8,538,212 B2* | 9/2013 | McGinnis | .......... | G02B 6/12014 385/31 |
| 2002/0085808 A1* | 7/2002 | Ooyama | ............ | G02B 6/12014 385/37 |

(Continued)

*Primary Examiner* — Robert Tavlykaev
(74) *Attorney, Agent, or Firm* — Jeffrey K. Jacobs (57) ABSTRACT

Athermal arrayed waveguide grating wavelength division multiplexers applicable to a relatively wide temperature range. One athermal arrayed waveguide grating wavelength division multiplexer includes a base board including an arrayed waveguide grating chip, wherein the base board and the arrayed waveguide grating chip are divided into a first portion and a second portion through at least one division plane; and a sliding deflection component positioned on the base board including a first end and a second end which are respectively fixed on the first portion and the second portion, the sliding deflection component including: a telescopic rod having a length that changes with temperature variation, a first sidewall and a second sidewall positioned at two ends of the telescopic rod, respectively, and a first deflection limiting piece fixed on one side of the telescopic rod.

10 Claims, 8 Drawing Sheets

(56) References Cited

U.S. PATENT DOCUMENTS

| 2002/0181871 A1* | 12/2002 | Saito | G02B 6/12014 |
|---|---|---|---|
| | | | 385/37 |
| 2003/0086674 A1* | 5/2003 | Yan | G02B 6/12009 |
| | | | 385/137 |
| 2008/0135169 A1* | 6/2008 | Rhee | G02B 6/12016 |
| | | | 156/256 |
| 2014/0112621 A1* | 4/2014 | Shen | G02B 6/1203 |
| | | | 385/37 |

* cited by examiner

ATHERMAL ARRAYED WAVEGUIDE GRATING WAVELENGTH DIVISION MULTIPLEXER

CROSS-REFERENCE TO RELATED APPLICATIONS

This application claims the benefit under 35 U.S.C. §119 of the filing date of Chinese Patent Application No. 201410172570.9, for Athermal Arrayed Waveguide Grating Wavelength Division Multiplexer, which was filed on Apr. 25, 2014, and which is incorporated here by reference.

BACKGROUND

The present specification relates to optical components.

With the development of the fiber optic communications network, data transmission speed of optical networks becomes faster and faster so as to satisfy the ever increasing capacity requirements for optical networks. In a typical high speed optical network system, wavelength division multiplexing technology is generally employed to improve capacity of the optical network. The multiplexing is typically provided through use of an arrayed waveguide grating wavelength division multiplexer.

One conventional athermal arrayed waveguide grating wavelength division multiplexer includes a base board. An arrayed waveguide grating chip made from a silicon material is arranged on the base board. A waveguide layer can be deposited on the arrayed waveguide grating chip. The waveguide layer typically includes an input optical waveguide, an input slab waveguide, an arrayed waveguide, an output slab waveguide, and an output optical waveguide. Generally, the waveguide layer can be made from a silica glass material and the arrayed waveguide can be composed of a plurality of strip waveguides which are arranged side by side. Additionally, the plurality of strip waveguides are arranged side by side in a bent manner, such that a length difference exists between every two adjacent strip waveguides. Consequently, each strip waveguide has a different length.

An output end of the input optical waveguide is connected to the input slab waveguide. The input slab waveguide is connected to the output slab waveguide through the strip waveguides. An output end of the output slab waveguide is connected to the multiple output optical waveguides.

SUMMARY

The present specification discloses an athermal arrayed waveguide grating wavelength division multiplexer applicable to a relatively wide temperature range.

In general, one innovative aspect of the subject matter described in this specification can be embodied as an athermal arrayed waveguide grating wavelength division multiplexer that includes a base board including an arrayed waveguide grating chip, the arrayed waveguide grating chip having a planar substrate on which an input optical waveguide, an input slab waveguide, a plurality of strip waveguides, an output slab waveguide and an output optical waveguide which are sequentially coupled, and wherein the base board and the arrayed waveguide grating chip are divided into a first portion and a second portion through at least one division plane, wherein the division plane runs through at least one of the input slab waveguide and the output slab waveguide; and a sliding deflection component positioned on the base board, the sliding deflection component including a first end and a second end which are respectively fixed on the first portion and the second portion, the sliding deflection component including: a telescopic rod having a length that changes with temperature variation, a first sidewall and a second sidewall positioned at two ends of the telescopic rod, respectively, and a first deflection limiting piece fixed on one side of the telescopic rod such that a clearance is formed between at least one portion of a first end face of the first deflection limiting piece and an inner surface of the first sidewall of the telescopic rod.

The foregoing and other embodiments can each optionally include one or more of the following features, alone or in combination. In particular, one embodiment includes all the following features in combination. The first end face of the first deflection limiting piece is a plane and an included angle formed between the first end face and the inner surface of the first sidewall is an acute angle. The first end face of the first deflection limiting piece is a cambered surface and one portion of the cambered surface abuts on the inner surface of the first sidewall. The first end face of the first deflection limiting piece is a cambered surface and the cambered surface is disposed separately from the inner surface of the first sidewall. A thermal expansion coefficient of the first deflection limiting piece is less than that of the telescopic rod. The first deflection limiting piece is fixed on one side of the telescopic rod through a fixing piece. The athermal arrayed waveguide grating wavelength division multiplexer of claim 1 further includes a second deflection limiting piece fixed on the other side of the telescopic rod such that a clearance is formed between at least one portion of the first end face and the inner surface of the first sidewall of the telescopic rod. A distance of the clearance formed between the first end face of the second deflection limiting piece and the inner surface of the first sidewall of the telescopic rod is more than a distance of the clearance formed between the first end face of the first deflection limiting piece and the inner surface of the first sidewall of the telescopic rod. Thermal expansion coefficients of the first deflection limiting piece and the second deflection limiting piece are less than a thermal expansion coefficient of the telescopic rod. Thermal expansion coefficients of the first deflection limiting piece and the second deflection limiting piece are identical. The thermal expansion coefficient of the first deflection limiting piece is more than or less than the thermal expansion coefficient of the second deflection limiting piece.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When a multiplexing optical signal transmitted in the input optical waveguide enters into the input slab waveguide, the multiplexing optical signal is not constrained in a lateral direction and is dispersed through diffraction. The multiplexing optical signal dispersed through diffraction in the lateral direction couples and enters into the plurality of strip waveguides and spreads therein. A certain phase differences exists between individual multiplexing optical signals arrived at the output slab waveguide through each strip waveguide due to the length differences existing among strip waveguides. Wavefront inclination in the output slab waveguide is caused due to those phase differences and their interference. The degree of phase shift is related to the wavelength of optical signals. A converge imaging position of optical signals differing in wavelength depends on the input optical wavelength through the output optical waveguides at various imaging positions. The optical signals differing in wavelength are decomposed into the corresponding output optical waveguides, thus completing a demultiplexing function.

The athermal arrayed waveguide grating wavelength division multiplexer is divided into two portions, a first portion and a second portion, through a division plane. The division plane transversely runs through the input slab waveguide. A sliding deflection component is arranged on the base board and two ends of the sliding deflection component are respectively fixed on the first portion and the second portion. A telescopic rod is arranged in the middle of the sliding deflection component and made from a material having a linear thermal expansion coefficient greater than that of the base board. In case of temperature variation, the telescopic rod stretches or retracts with temperature variation and the first portion displaces relative to the second portion, at which time, the two portions divided from the input slab waveguide displace relative to each other as well, so as to compensate a central wavelength of the athermal arrayed waveguide grating wavelength division multiplexer.

However, the central wavelength of the athermal arrayed waveguide grating wavelength division multiplexer significantly changes with extreme temperature variation. The multiplexer is typically applicable to systems with working temperature ranges within −5° C. and 70° C. and channel frequency spacing at 100 GHz or above; under an environment that temperature varies from −40° C. to 80° C., the central wavelength of the athermal arrayed waveguide grating wavelength division multiplexer is increased with extreme temperature variation, and can fail to meet a working requirement.

Figure 1:
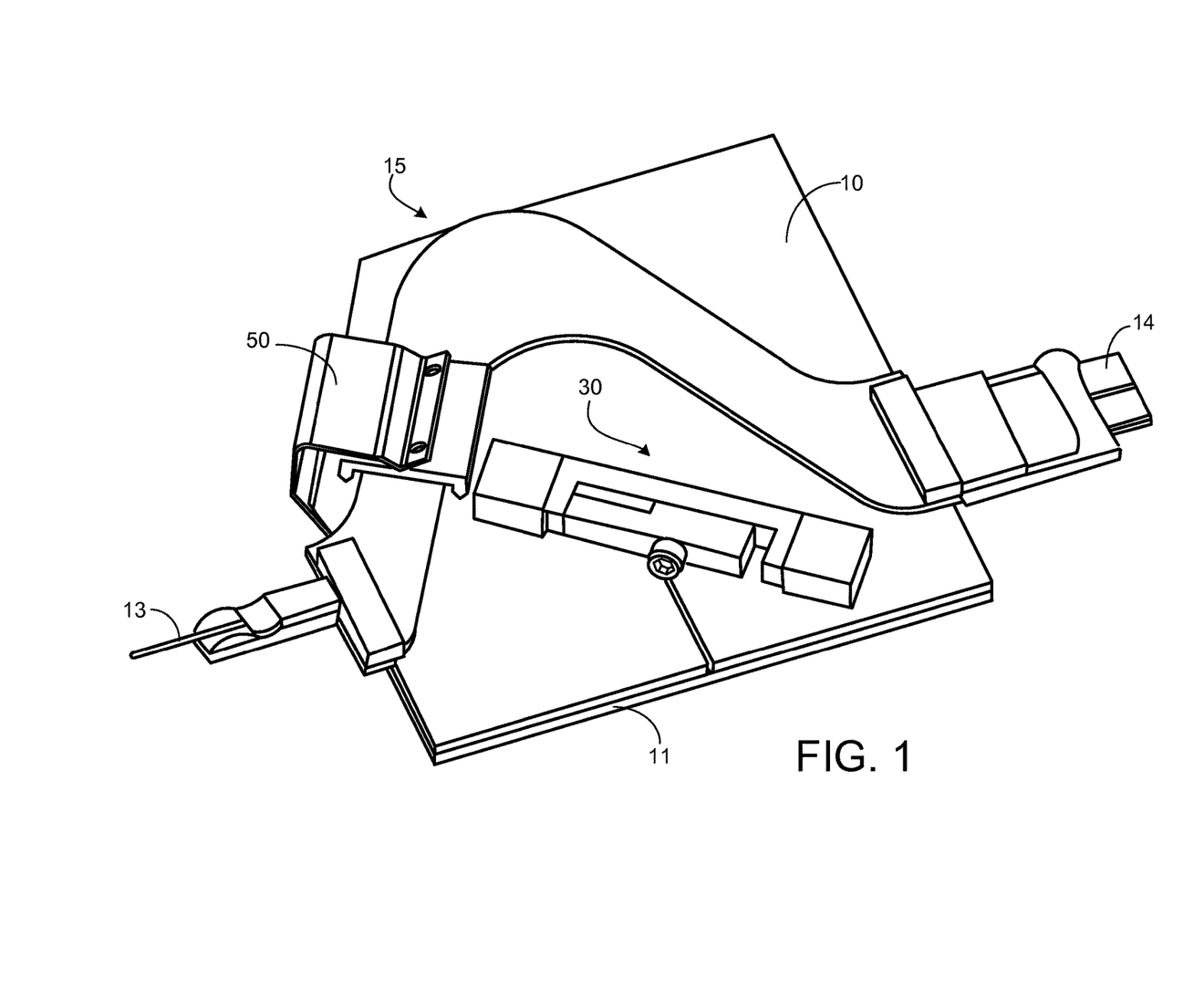
FIG. 1 is a structural diagram of a first example athermal arrayed waveguide grating wavelength division multiplexer.

First Implementation of the Athermal Arrayed Waveguide Grating Wavelength Division Multiplexer:

FIG. 1 is a structure diagram of a first example athermal arrayed waveguide grating wavelength division multiplexer 100. The athermal arrayed waveguide grating wavelength division multiplexer 100 includes a base board 10 and an auxiliary base board 11 arranged below the base board 10. The auxiliary base board 11 is made from same material as the base board 10. An arrayed waveguide grating chip 15 is arranged on the upper surface of the base board 10 and having a bent path. An input optical fiber 13 and output optical fibers 14 are respectively arranged at two ends of the arrayed waveguide grating chip 15. The input optical fiber 13 includes one optical fiber and the output optical fibers 14 includes multiple optical fibers. An optical signal can be received from the input optical fiber 13, transmitted through the arrayed waveguide grating chip 15, and output from one or more of the output optical fibers 14.

Figure 2:
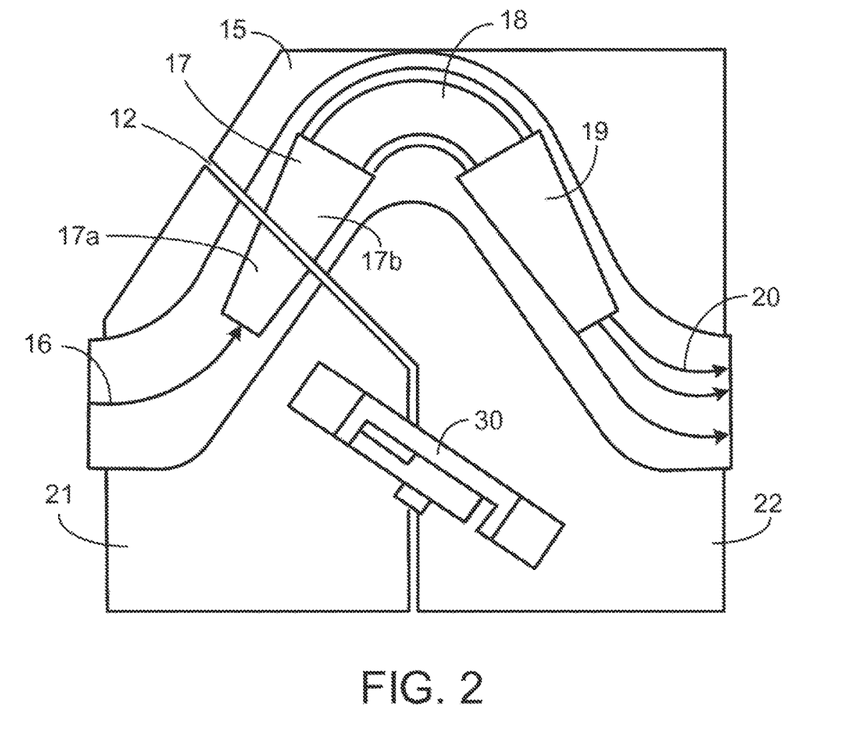
FIG. 2 is a structural schematic diagram of the first example athermal arrayed waveguide grating wavelength division multiplexer after a deflection inhibiting component is hidden.

FIG. 2 is a structural schematic diagram of the first example athermal arrayed waveguide grating wavelength division multiplexer 100 after a deflection inhibiting component 50 is hidden. The arrayed waveguide grating chip 15 includes a planar substrate that is made from a silicon material and with a waveguide layer deposited on the substrate. The waveguide layer includes an input optical waveguide 16, an input slab waveguide 17, an arrayed waveguide 18, an output slab waveguide 19, and multiple output optical waveguides 20, each of which are sequentially coupled. The arrayed waveguide 18 includes multiple strip waveguides that are arranged side by side in a bent manner. A specified length difference exists between every two adjacent strip waveguides. An optical signal of the input optical fiber 13 is received by the input optical waveguide 16 and an optical signal of the output optical waveguides 20 is output to one of the output optical fibers 14.

The base board 10 is composed of a silicon material. The arrayed waveguide grating chip 15 can be bound to a relatively large base board 10 using a suitable affixing material such as glue. In some implementations, the base board 10 can be made from other materials such as heat-resistant glass (Pyrex) or invar alloy.

The base board 10 is divided into two portions along a division plane 12 into a first portion 21 and a second portion 22. The first portion 21 encompasses a relatively small area of the base board 10 and the second portion 22 encompasses a relatively large area of the base board 10. The division plane 12 includes two planes in which one plane transversely runs through the input slab waveguide 17 so as to divide the input slab waveguide 17 into a first input slab waveguide 17a and a second input slab waveguide 17b. The way of running through transversely means that the division plane extends in a direction substantially perpendicular to an axis of the input slab waveguide 17 and runs through the input slab waveguide 17 such that the input slab waveguide 17 is divided by the division plane 12.

In some implementations, the division plane 12 is perpendicular to the upper surface of the input slab waveguide 17. The division plane 12 can form a relatively small included angle with the upper surface of the input slab waveguide 17, e.g., an included angle of 8 degrees. In addition, the division plane can transversely run through the joint area between the input optical waveguide 16 and the input slab waveguide 17.

Since the base board 10 is divided into the first portion 21 and the second portion 22, the first portion 21 can displace relative to the second portion 22. The arrayed waveguide grating chip 15 on the first portion 21 is partially bound to the first portion 11. Therefore, the first input slab waveguide 17a displaces relative to the second input slab waveguide 17b as well when the first portion 21 displaces relative to the second portion 22. By regulating relative positions of the first input slab waveguide 17a and the second input slab waveguide 17b, the central wavelength of the athermal arrayed waveguide grating wavelength division multiplexer 100 can be controlled. Therefore, at various temperatures, the central wavelength can be adjusted by controlling relative positions of the first input slab waveguide 17a and the second input slab waveguide 17b, so as to compensate for temperature drift. This improves working stability of the athermal arrayed waveguide grating wavelength division multiplexer 100.

Figure 3:
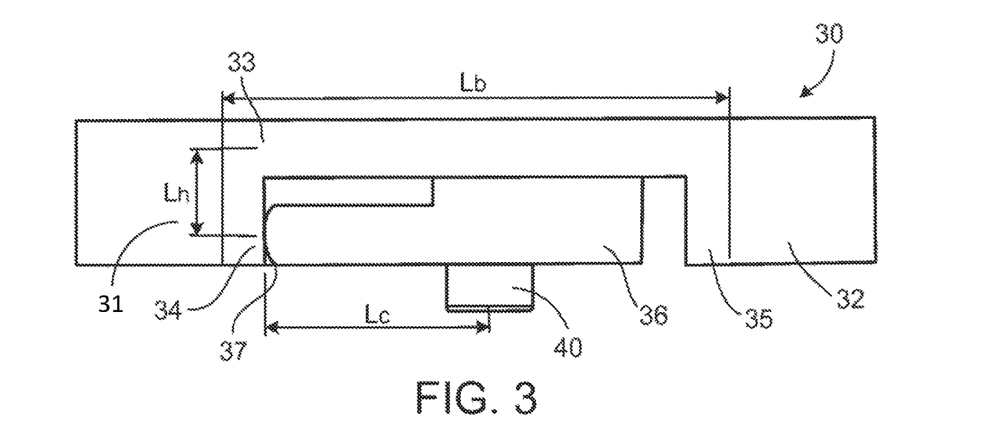
FIG. 3 is a structural diagram of a sliding deflection component according to the first example athermal arrayed waveguide grating wavelength division multiplexer.

To provide the regulation of relative positions of the first input slab waveguide 17a and the second input slab waveguide 17b, a sliding deflection component 30 is arranged on the base board 10. FIG. 3 is a structural diagram of a sliding deflection component according to the example athermal arrayed waveguide grating wavelength division multiplexer 100. As shown in FIG. 3, a telescopic rod 33 is arranged on the sliding component 30. The telescopic rod 33 is made from a material having a linear thermal expansion coefficient that is greater than that of a silicon material, such as an aluminum material, wherein two ends of the telescopic rod 33 are respectively fixed on the first portion 21 and the second portion 22 through fixing pieces 31 and 32.

In some implementations, the fixing pieces 31 and 32 are made from UV light transparent materials. For example, a heat resistant glass, which is close to the silicon material in linear thermal expansion coefficient and is UV light transparent, can be used as the material for manufacturing the fixing pieces 31 and 32. In addition, two ends of the telescopic rod 33 can be bound to the sidewalls of the fixing pieces 31 and 32 using a UV curing glue or other suitable affixing material.

The two end faces of the telescopic rod 33 that transversely stretch or retract are respectively fixed to sidewalls of two heat resistant glass fixing pieces 31 and 32. Therefore, the effective length of the telescopic rod 33 can be precisely controlled. However, binding quality between the telescopic rod 33 and the heat resistant glass fixing pieces 31 and 32 influences the quality of the sliding deflection component 30. In some instances, a UV curing glue works under a tensile stress mode as well as under a pressure stress mode. Widths of the heat resistant glass fixing pieces 31 and 32 in a direction in which the telescopic rod 33 stretches or retracts can be increased and the heights of the fixing pieces 31 and 32 in a direction vertical to the upper surface of the base board 10 can be reduced.

As shown in FIG. 3, a first sidewall 34 and a second sidewall 35 are respectively positioned on two ends of the telescopic rod 33. A deflection limiting piece 36 is positioned on one side of the telescopic rod 33. The first end 37 of the deflection limiting piece 36 can be a cambered surface. A small clearance can be maintained between the cambered surface 37 and the inner surface of the first sidewall 34. The second end of the deflection limiting piece 36 can be a planar and is disposed separately from the inner surface of the second sidewall 35. In the example shown in FIG. 3, the deflection limiting piece 36 is fixed on the telescopic rod 33, for example using a screw 40. In particular, threaded holes can be formed in the deflection limiting piece 36 and the telescopic rod 33. The screw 40 is screwed into the threaded holes of the deflection limiting piece 36 and the telescopic rod 33, thus fixing the deflection limiting piece 36. Other suitable fixing techniques and components can be used instead of the screw 40.

Figure 4:
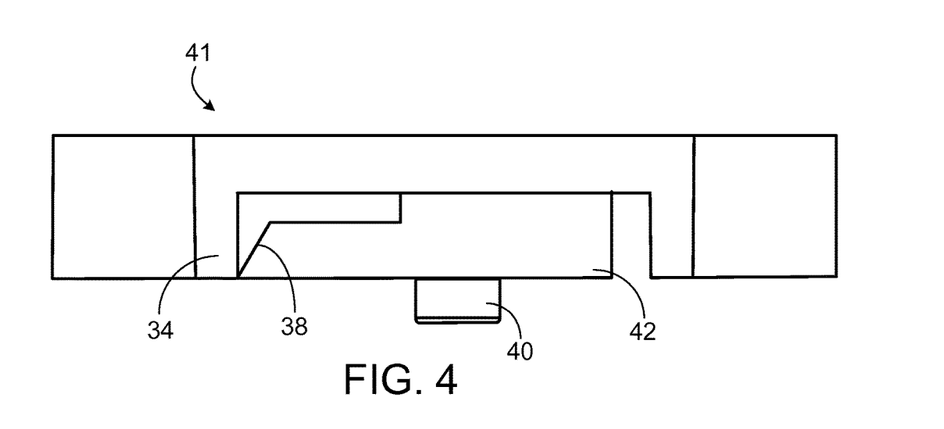
FIG. 4 is a structural diagram of another example sliding deflection component of the first example athermal arrayed waveguide grating wavelength division multiplexer.

In some other implementations, the first end of the deflection limiting piece 36 is not a cambered surface, for example, as shown in FIG. 4.

FIG. 4 is a structural diagram of another example sliding deflection component 41 of the first example athermal arrayed waveguide grating wavelength division multiplexer. In FIG. 4, a first end 38 of a deflection limiting piece 42 is an angled plane, for example, the first end 38 can be an angled plane with an included angle, that can be an acute angle, formed between the first end 38 of the deflection limiting piece 42 and an inner surface of the first sidewall 34 of the telescopic rod 33. A clearance is maintained between the first end 38 of the deflection limiting piece 42 and the inner surface of the first sidewall 34 of the telescopic rod 33.

Figure 5:
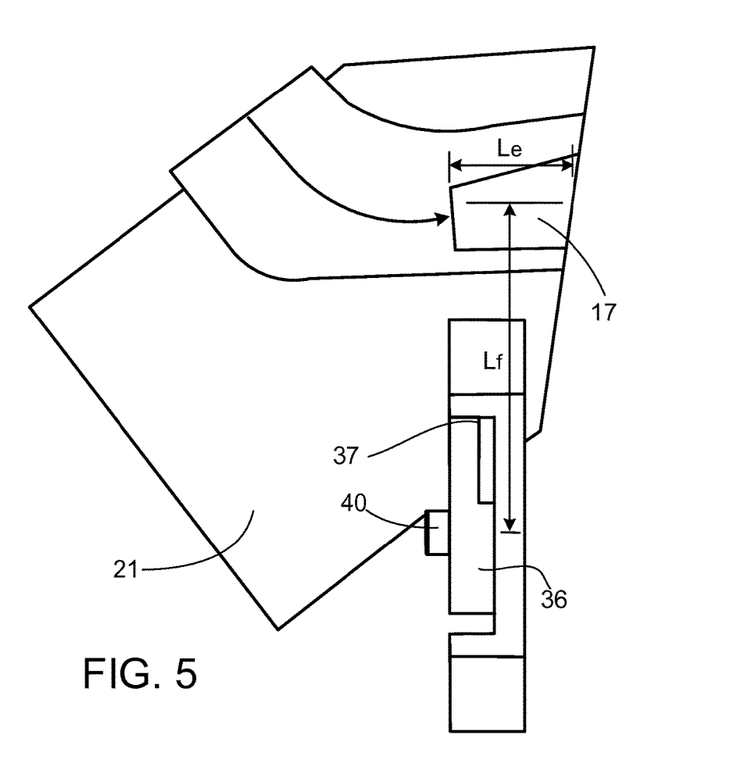
FIG. 5 is a structural diagram of an example first portion and sliding deflection component according to the first example athermal arrayed waveguide grating wavelength division multiplexer in a first state.

FIG. 5 is a structural diagram of an example first portion and sliding deflection component 30 according to the first example athermal arrayed waveguide grating wavelength division multiplexer in a first state. As shown in FIG. 5, at normal temperature, such as 23° C., the sliding deflection component 30 does not deflect. In a process of increasing temperature, a length of the telescopic rod 33, illustrated as length Lb (FIG. 3), is increased, linear compensation is carried on the central wavelength through linear sliding of the sliding deflection component 30. The length Lb of the telescopic rod 33 can be calculated according to Formula 1:

$$\frac{dx}{dT} = \frac{L_j \Delta L}{n_g d\lambda_c} n_g \frac{d\lambda_c}{dT}$$ (Formula 1)

Formula 1 represents an imaging position displacement dx required by a central wavelength deflection dλ caused by compensation temperature change dT, wherein, $L_f$ is a focus of a slab waveguide, ΔL is a length difference of adjacent strip waveguides of the arrayed waveguide 18, d is a distance of waveguide in the arrayed waveguide portion on the interface between the arrayed waveguide 18 and the output slab waveguide 19, $n_s$ is an effective refractive index of the slab waveguide and $n_g$ is a group refractive index of the arrayed waveguide.

Figure 6:
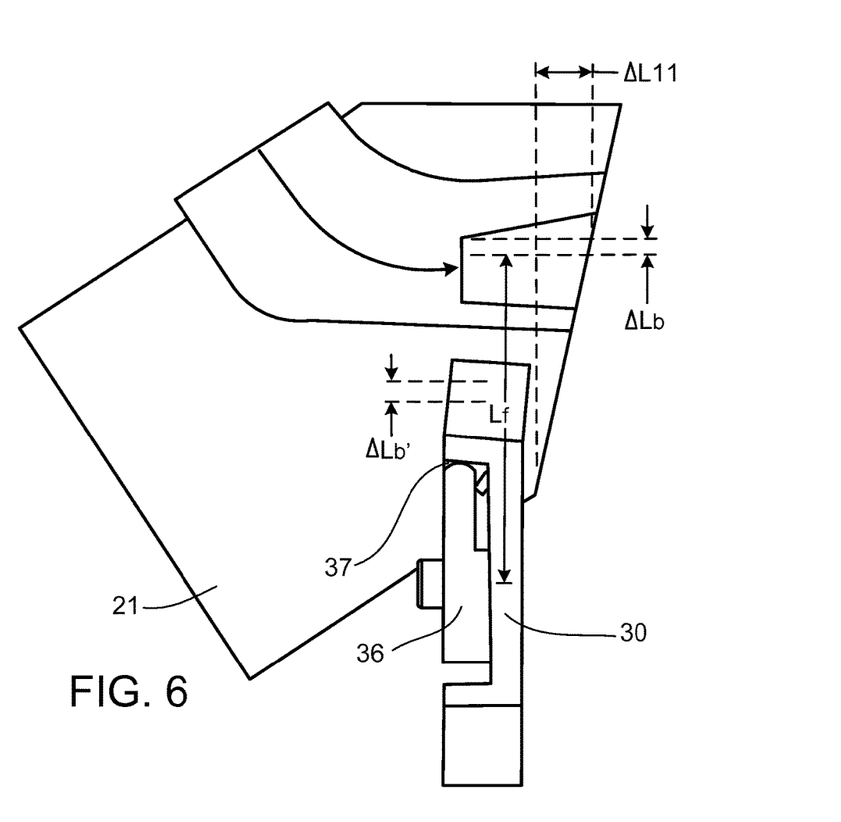
FIG. 6 is a structural diagram of the example first portion and sliding deflection component according to the first example athermal arrayed waveguide grating wavelength division multiplexer in a second state.

If both $$\frac{d\lambda_c}{dT} \text{ and } \frac{dx}{dT}$$

are linear or are identical in nonlinearity, the central wavelength drift with temperature variation can be compensated through stretching or retracting of the telescopic rod 33. Under actual situations, $$\frac{dx}{dT}$$

keeps a nonlinear relation with temperature. For example, a change of the $$\frac{dx}{dT}$$

is about 0.325 μm/° C. in a temperature range from −30° C. to 23° C. and about 0.365 μm/° C. in a temperature range from 23° C. to 75° C. For the sliding deflection component provided with the telescopic rod 33, an included angle θ is formed between two fixing pieces 31 and 32 through co-action of the deflection limiting piece 36 and the telescopic rod 33 at temperatures below normal temperature 23° C., as shown in FIG. 6.

According to a grating phase difference formula, $$\delta = \frac{2\pi}{\lambda_c} d_0 \sin(\theta_0 - \theta),$$

within the range of 0°<$\theta_0$−θ<90°, when θ is increased, a phase difference δ of the grating is reduced, and correspondingly, the central wavelength of waveguide grating chip will change to a short wavelength. In the above formula, $d_0$ is a grating slit width and $\theta_0$ is an initial incident light angle of the grating.

Therefore, a change of $$\frac{dx}{dT}$$

can be controlled by controlling the included angle θ between the angle fixing pieces 31 and 32, thus achieving a compensation effect. The included angle θ is determined by an effective height Lh and effective length Lc of the deflection limiting piece 36 as shown in FIG. 3 as well as the thermal expansion coefficients of the telescopic rod 33 and the deflection limiting piece 36. Variation of typical θ and central wavelength can be approximately calculated using formula $\lambda_c = \alpha_1\theta + \alpha_2\theta^2 + \alpha_3\theta^3$, wherein $\alpha_1$, $\alpha_2$, and $\alpha_3$ are constant coefficients related to design and material of waveguide grating chip.

In some implementations, the mechanical strength of the deflection limiting piece 36 is greater than that of the telescopic rod 33. Therefore deformation of the deflection limiting piece 36 and the telescopic rod 33 generated at low temperatures can be completely converted into deflection angle θ of the telescopic rod 33, at which time the deflection angle θ can be calculated by the Formula 2:

$$\theta = \arctan\left(\frac{(\Delta\alpha)L_c(\Delta T)}{L_c}\right) \quad \text{(Formula 2)}$$

In Formula 2, Δα represents a difference between linear thermal expansion coefficients of the telescopic rod 33 and the deflection limiting piece 36. Provided that imaging position displacement required by central wavelength deflection dX caused by deflection angle θ relative to the compensation temperature change dT is dx', and Le in FIG. 5 is assumed to be parallel with Lf and symmetrical with the straight line passing through central point of the deflection limiting piece 36, an absolute value of integral value of the dx' between −30° C. and 23° C. is equal to −Δdx/dT×(23° C.−(−30° C.)), where Δdx/dT represents the $$\frac{dx}{dT}$$

difference between two temperature ranges, e.g., 23° C.-75° C. and −30° C.-23° C., for example (0.365 μm/° C.-0.325 μm/° C.) as mentioned above. The value of θ at a particular temperature, e.g., −30° C. can be calculated according to Formula 3:

$$\int_{-30}^{23}\left(\frac{dx'}{dT}\right)dT = -\Delta dx/dT \times (23° \text{ C.}(-30° \text{ C.})) \quad \text{(Formula 3)}$$

In some scenarios, for the arrayed waveguide grating chip, θ value at −30° C. can be calculated through Formula 3 by measuring intrinsic parameters in the formula, adopting materials with known thermal expansion coefficients, and setting Lb through $$\frac{dx}{dT}$$

value in temperature range from 23° C. to 75° C.

Figure 7:
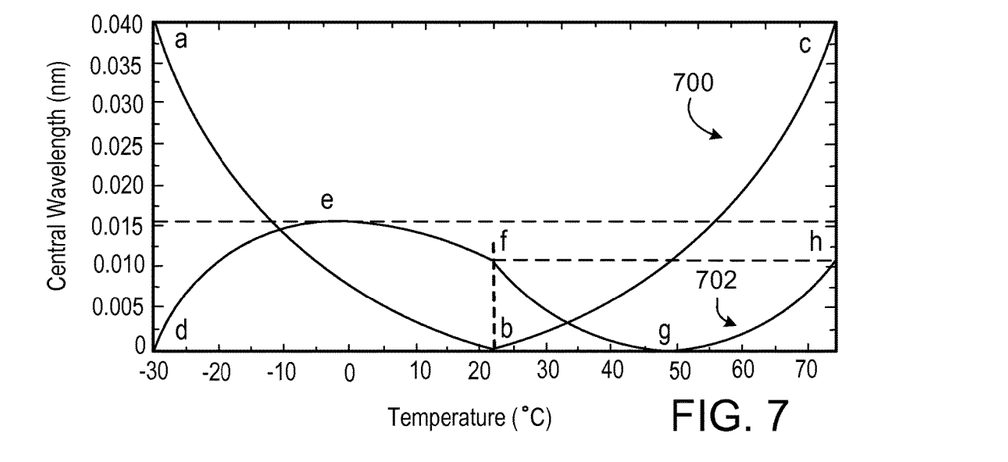
FIG. 7 is a graph showing an example relation between central wavelength and temperature according to the first example athermal arrayed waveguide grating wavelength division multiplexer.

For a typical arrayed waveguide grating that carries out central wavelength compensation through the telescopic rod only, a central wavelength offset is 0.04 nm in a temperature range between −30° C. to 75° C., is shown by curve a-b-c 700 in FIG. 7. Therefore, the central wavelength of the compensated arrayed waveguide grating is relatively poor in stability at 75° C. and −30° C. However, when compensating the central wavelength through the sliding deflection component, the athermal arrayed waveguide grating wavelength division multiplexer can achieve a technical effect of controlling central wavelength offset less than 0.02 nm in a temperature range from −30° C. to 75° C., as shown by curve d-e-f-g-h 702 in FIG. 7.

As shown in FIG. 6, when angle deflection of the waveguide grating chip occurs, variation $\Delta L_{11}$ of slit width at the waveguide center occurs. The variation can affect an optical path difference of a grating front-end waveguide. In an assembling process, by setting a suitable position of the sliding deflection component 30 and arranging the central point to be coincided with central axis of waveguide, namely $\Delta L_{11}=0$, the influence on the optical path difference can be substantially eliminated. FIG. 6 shows an extreme position of angle deflection circle center of the sliding deflection component 30, and the circle center can be positioned close to the extreme position by regulating shape and size of the telescopic rod.

The first end 37 of the deflection limiting piece 36 is a cambered surface. The first end 37 maintains a clearance with the inner surface of the first sidewall 34. As a result, the deflection limiting piece 36 causes the two fixing pieces 31 and 32 to rotate relative to each other when the temperature is reduced, so as to better compensate the central wavelength. Therefore, according to the implementation, the thermal expansion coefficient of the deflection limiting piece 36 is less than that of the telescopic rod 33. In some implementations, the deflection limiting piece 36 is constructed from a material that is insensitive to temperature change.

The first portion 21 and the second portion 22 of the base board 10, which are separated, are configured for relative movement in a direction vertical to the upper surface of the base board 10. Therefore, according to some implementations, there is a deflection inhibiting component for inhibiting the first portion 21 from moving or rotating relative to the second portion 22 in a direction vertical to the plane of the base board 10.

Figure 8:
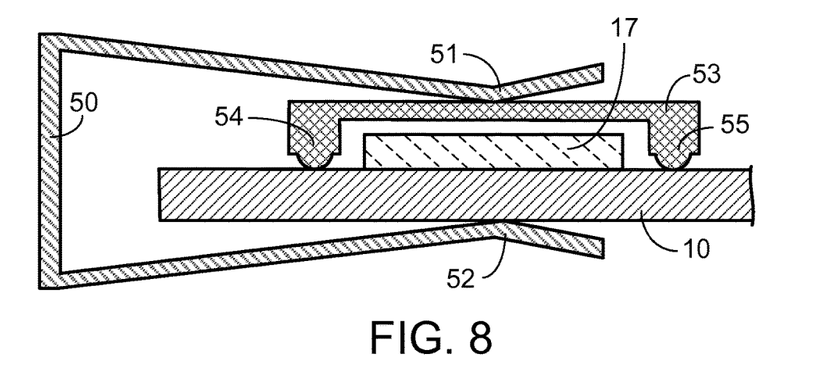
FIG. 8 is a sectional view of an example deflection inhibiting component according to the first example athermal arrayed waveguide grating wavelength division multiplexer with a base board and an input slab waveguide.

As shown in FIG. 1 and FIG. 8, the deflection inhibiting component includes a clamp 50 and a press plate 53. Two ejection pins 54 and 55 are arranged on the press plate 53 located on one pair of relative sides of the press plate 53, and extending from the plate body of the press plate 53 toward the upper surface of the base board 10. The two ejection pins 54 and 55 are positioned against upper surface of the base board 10. A specified amount of space is maintained between the two ejection pins 54 and 55. The input slab waveguide 17 is located between the two ejection pins 54 and 55 and the upper surface of the input slab waveguide 17 is free from contact with the press plate 53 so that the input slab waveguide 17 is not squeezed by the press plate 53, thereby avoiding influence on the input slab waveguide.

The clamp 50 has an upper ejection side 51 and a lower ejection side 52. The ejection side 51 is positioned against a surface of the press plate 53 back to the base board 10 while the ejection side 52 is positioned against the lower surface of the base board 10. As shown in FIG. 1, the deflection inhibiting component crosses over the first portion 21 and the second portion 22. The two ejection pins 54 and 55 of the press plate 53 are positioned against the upper surface of the first portion 21 and the upper surface of the second portion 22. The ejection side 52 of the clamp 50 is positioned against the lower surfaces of the first portion 21 and the second portion 22. Consequently, the first portion 21 and the second portion 22 are substantially prevented from deflecting in a direction vertical to the upper surface of the base board 10.

Figure 9:
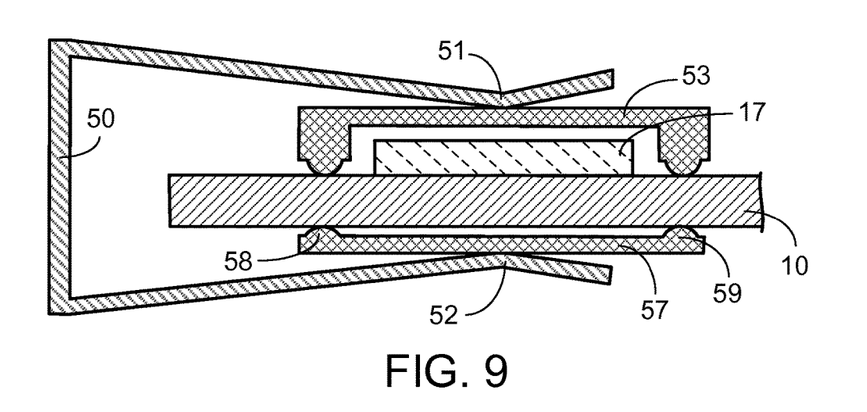
FIG. 9 is a sectional view of the example deflection inhibiting component according to another example of the first example athermal arrayed waveguide grating wavelength division multiplexer.

To reduce damage of the ejection side 52 of the clamp 50 on the lower surface of the base board 10, a press plate can be arranged on the lower surface of the base board 10, as shown in FIG. 9. In particular, a press plate 57 can be arranged on the lower surface of the base board 10. Two ends of the press plate 57 are provided with ejection pins 58 and 59, wherein the ejection side 52 is positioned against the surface of the press plate 57.

Figure 10:
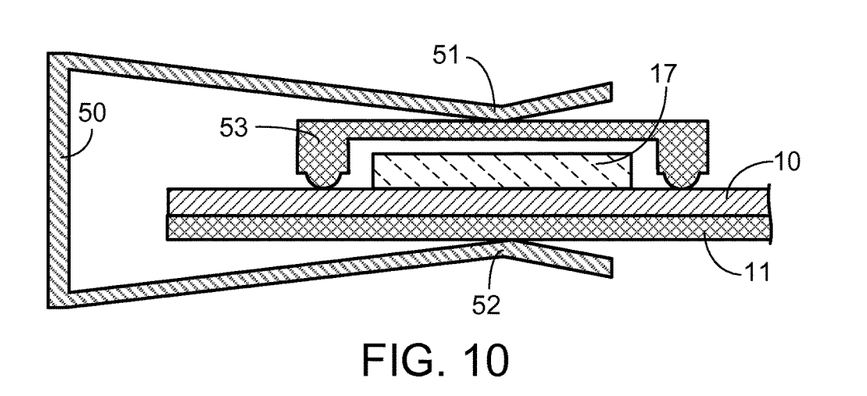
FIG. 10 is a sectional view of the example deflection inhibiting component according to another example of the first example athermal arrayed waveguide grating wavelength division multiplexer.

In addition, an auxiliary base board 11 can be arranged on the lower surface of the base board 10. As shown in FIG. 10, the ejection side 52 of the clamp 50, instead of being directly positioned against the lower surface of the base board 10, is instead positioned against the lower surface of the auxiliary base board 11.

According to the scheme, when the first end 37 of the deflection limiting piece 36 contacts the inner surface of the first sidewall 34 of the telescopic rod 33, the critical point temperature is 23° C. However, within a wider working temperature range, such as from −40° C. to 85° C., a central wavelength offset of the athermal arrayed waveguide grating wavelength division multiplexer according to the first implementation will still exceed 0.02 nm.

As shown at point d on curve d-e-f-g-h 702 in FIG. 7, when the temperature is less than −30° C., the central wavelength of the athermal arrayed waveguide grating wavelength division multiplexer will change toward short wave sharply. In a network system with frequency spacing less than 100 GHz, the wavelength division multiplexer according to the first implementation is optimized.

Second Implementation of the Athermal Arrayed Waveguide Grating Wavelength Division Multiplexer:

Similar to the athermal arrayed waveguide grating wavelength division multiplexer of FIG. 1, an athermal arrayed waveguide grating wavelength division multiplexer according to the second implementation includes a base board, wherein the base board is constructed with an arrayed waveguide grating chip that includes an input optical waveguide, an input slab waveguide, an arrayed waveguide, an output slab waveguide and multiple output optical waveguides. The base board is divided into two portions, and a sliding deflection component is positioned on the base board.

Figure 11:
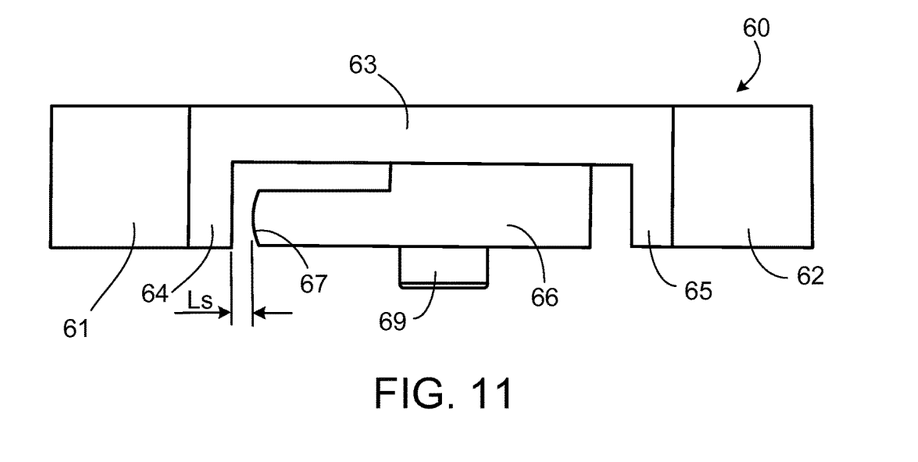
FIG. 11 is a structural diagram of an example sliding deflection component according to invention second example athermal arrayed waveguide grating wavelength division multiplexer.

As shown in FIG. 11, a telescopic rod 63 is positioned on a sliding deflection component 60. Two ends of the telescopic rod 63 are respectively provided with fixing pieces 61 and 62, which are respectively fixed on the first portion and the second portion of the base board. A first sidewall 64 and a second sidewall 65 are respectively arranged at two ends of the telescopic rod 63. The outer end face of the first sidewall 64 is fixed on the fixing piece 61, for example, using a UV curing glue. The outer end face of the second sidewall 65 is fixed on the fixing piece 62, for example, using a UV curing glue. In some implementations, the telescopic rod 63 can change with temperature variation.

A deflection limiting piece 66 is fixed on one side of the telescopic rod 63. The first end face 67 of the deflection limiting piece 66 is a cambered surface. In contrast to the deflection limiting piece 36 of FIG. 3, the first end face 67 is not abutted on an inner surface of the first sidewall 64 and maintains a clearance of length Ls. The length of the clearance is a distance Ls between a tangent line of the cambered surface parallel to the inner surface of the first sidewall 64 and the inner surface of the first sidewall 64. The second end face of the deflection limiting piece 66 is a plane, and the plane is disposed separately from the inner surface of the second sidewall 65. According to the second implementation, the deflection limiting piece 66 is fixed on the telescopic rod 66 using a fixing structure such as a screw 69.

A clearance is maintained between the first end face 67 of the deflection limiting piece 66 and the inner surface of the first sidewall 64. The telescopic rod 63 begins to shrink when the temperature is reduced and the deflection limiting piece 66 begins to deflect with further decrement of the temperature when the first end face 67 of the deflection limiting piece 66 is positioned against inner surface of the first sidewall 64. In this way, the critical temperature of the central wavelength of the athermal arrayed waveguide grating wavelength division multiplexer, instead of 23° C., is 13° C.

Figure 12:
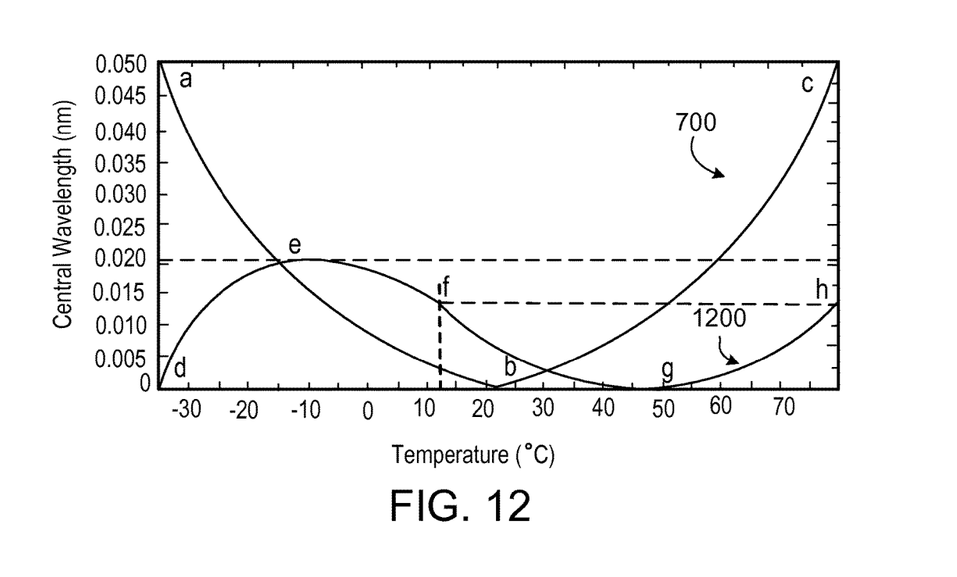
FIG. 12 is a graph showing an example relation between central wavelength and temperature according to the second example athermal arrayed waveguide grating wavelength division multiplexer.

Curve d-e-f-g-h 1200 in FIG. 12 shows change curve of the central wavelength of the athermal arrayed waveguide grating wavelength division multiplexer with temperature variation indicating that the applicable temperature range is wider. The curve d-e-f-g-h 1200 is shown in contrast to the curve a-b-c 700.

Figure 13:
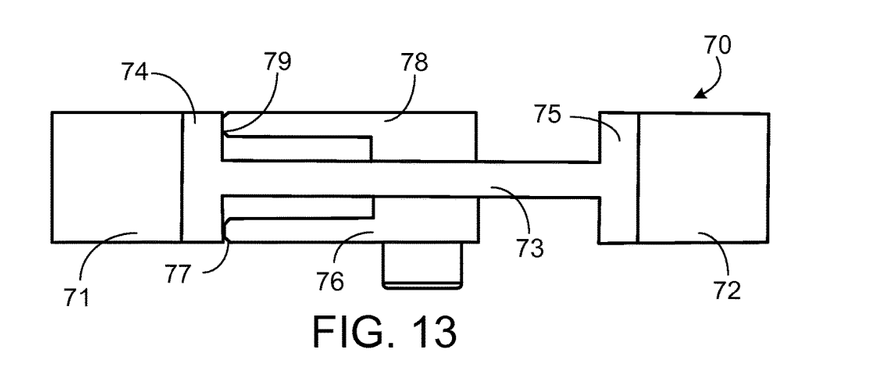
FIG. 13 is a structural diagram of an example sliding deflection component according to a third example athermal arrayed waveguide grating wavelength division multiplexer.

Third Implementation of the Athermal Arrayed Waveguide Grating Wavelength Division Multiplexer:

To enhance the compensation effect of the athermal arrayed waveguide grating wavelength division multiplexer on the central wavelength, the sliding deflection component can additionally include two deflection limiting pieces. As shown in FIG. 13, a sliding deflection component 70 has a telescopic rod 73 that can stretch or retract with temperature variation. Fixing pieces 71 and 72 are respectively arranged at two ends of the telescopic rod 73 and are respectively fixed on the first portion and the second portion of the base board, e.g., base board 10 of FIG. 1. A first sidewall 74 and a second sidewall 75 are respectively arranged at two opposing ends of the telescopic rod 73.

Different from the first implementation described above with respect to FIGS. 1-3, deflection limiting pieces 76 and 78 are respectively arranged on two sides of the telescopic rod 73. The first end faces 77 and 79 of both deflection limiting pieces 76 and 78 are cambered surfaces and are abutted on the inner surface of the first sidewall 74. The second end faces of both the deflection limiting pieces 76 and 78 are positioned separately from the inner surface of the second sidewall 75.

The thermal expansion coefficients of both the deflection limiting pieces 76 and 78 are less than that of the telescopic rod 73. In some implementations, the deflection limiting pieces 76 and 78 are identical in thermal expansion coefficient. In some other implementations, the deflection limiting pieces 76 and 78 have different thermal expansion coefficients. For example the thermal expansion coefficient of the deflection limiting piece 76 can be more than that of the deflection limiting piece 78, or less than that of the deflection limiting piece 78.

Figure 14:
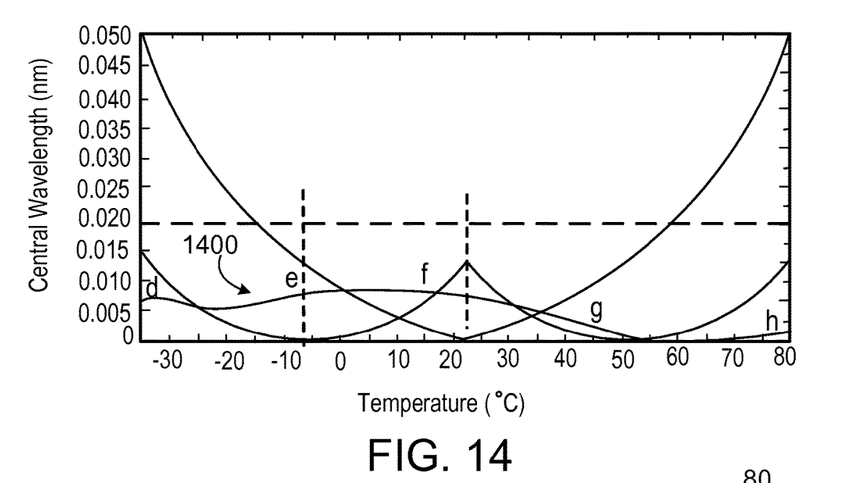
FIG. 14 is a graph showing an example relation between central wavelength and temperature according to the third example athermal arrayed waveguide grating wavelength division multiplexer.

The third implementation of the athermal arrayed waveguide grating wavelength division multiplexer provides bipolar linear compensation. As shown by curve d-e-f-g-h 1400 in FIG. 14, the central wavelength offset of the athermal arrayed waveguide grating wavelength division multiplexer can be controlled to be less than 0.020 nm within a temperature range from −40° C. to 85° C., to substantially achieve an optimized temperature compensation effect.

Fourth Implementation of the Athermal Arrayed Waveguide Grating Wavelength Division Multiplexer:

To further enhance the compensation effect on the central wavelength of an athermal arrayed waveguide grating wavelength division multiplexer, the distances of the clearances maintained between the first end faces of the two deflection limiting pieces of the sliding deflection component and the first sidewall of the telescopic rod may be different.

Figure 15:
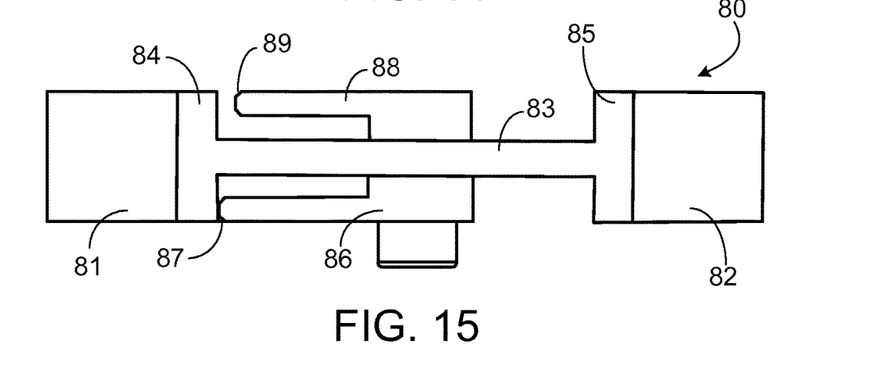
FIG. 15 is a structural diagram of an example sliding deflection component according to a fourth example athermal arrayed waveguide grating wavelength division multiplexer.

As shown in FIG. 15, a sliding deflection component 80 includes a telescopic rod 83 that can stretch along with temperature change. Fixing pieces 81 and 82 are respectively arranged at two ends of the telescopic rod 83 and are respectively fixed on the first portion and the second portion of the base board, e.g., base board 10 of FIG. 1. A first sidewall 84 and a second sidewall 85 are respectively arranged at two opposing ends of the telescopic rod 83.

Additionally, deflection limiting pieces 86 and 88 are respectively arranged on two sides of the telescopic rod 83. The first end faces 87 and 89 of both the deflection limiting pieces 86 and 88 are cambered surfaces. Different from the third implementation of the athermal arrayed waveguide grating wavelength division multiplexer, the first end face 87 of the deflection limiting piece 86 abuts on the inner surface of the first sidewall 84 while the first end face 89 of the deflection limiting piece 88 keeps a relatively large clearance with the inner surface of the first sidewall 84. As a result, the clearance between the first end face 87 of the deflection limiting piece 86 and the inner surface of the first sidewall 84 is shorter than the clearance between the first end face 89 of the deflection limiting piece 88 and the inner surface of the first sidewall 84. Furthermore, the second end faces of the deflection limiting pieces 86 and 88 are disposed separately from the inner surface of the second sidewall 85.

The fourth implementation of the athermal arrayed waveguide grating wavelength division multiplexer adopts a bipolar linear compensation in connection with angle compensation, within a temperature range from −40° C. to 85° C., the central wavelength offset of the athermal arrayed waveguide grating wavelength division multiplexer can be controlled to be less than 0.010 nm.

The thermal expansion coefficients of both the deflection limiting pieces 86 and 88 are less than that of the telescopic rod. In some implementations, the deflection limiting pieces 86 and 88 have a similar or same thermal expansion coefficient. In some other implementations, the deflection limiting pieces 86 and 88 have different thermal expansion coefficients. For example the thermal expansion coefficient of the deflection limiting piece 86 can be more than that of the deflection limiting piece 88, or less than that of the deflection limiting piece 88.

Fifth Implementation of the Athermal Arrayed Waveguide Grating Wavelength Division Multiplexer:

In some implementations of the athermal arrayed waveguide grating wavelength division multiplexer, the sliding deflection component will not cross over the input slab waveguide. However, in some other implementations, the sliding deflection component can cross over the input slab waveguide.

Figure 16:
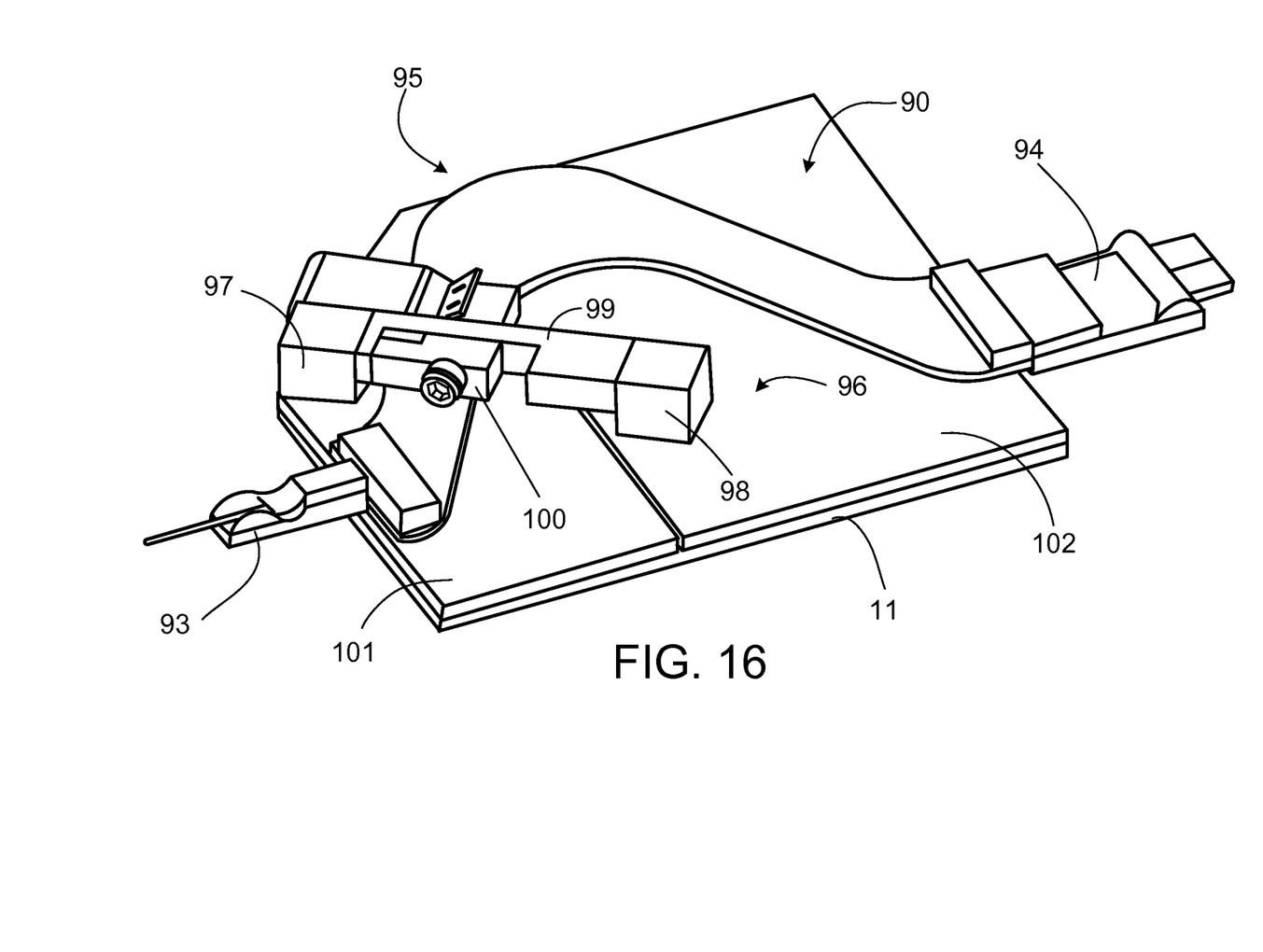
FIG. 16 is a structural diagram of a fifth example athermal arrayed waveguide grating wavelength division multiplexer.

As shown in FIG. 16, in the fifth implementation of the athermal arrayed waveguide grating wavelength division multiplexer, an auxiliary base board 91 is arranged below a base board 90 and an arrayed waveguide grating chip 95 is arranged on the upper surface of the base board 90. An input optical fiber 93 and multiple output optical fibers 94 are respectively arranged at two ends of the arrayed waveguide grating chip 95.

The arrayed waveguide grating chip 95 includes a planar substrate onto which a waveguide layer is deposited. An input optical waveguide, an input slab waveguide, an arrayed waveguide, an output slab waveguide and multiple output optical waveguides, which are sequentially connected, are arranged on the waveguide layer. The input optical waveguide is used for receiving optical signal of the input optical fiber 93 and the optical signal of the output optical waveguide is outputted to one or more of the output optical fibers 94.

The base board 90 is divided into two portions through a division plane, a first portion 101 and a second portion 102, and a sliding deflection component 96 is arranged on the base board 90. The sliding deflection component 96 includes a telescopic rod 99 and fixing pieces 97 and 98 at two ends of the telescopic rod 99. The fixing pieces 97 and 98 are respectively fixed on the first portion 101 and the second portion 102. A deflection limiting piece 100 is arranged on one side of the telescopic rod 99. As seen from FIG. 16, the input slab waveguide is arranged below the telescopic rod 99. Therefore, the sliding deflection component 96 can cross over the input slab waveguide.

Positioning the deflection limiting pieces on one or two sides of the telescopic rod 99 allows the first portion and the second portion of the base board to rotate relative to each other when the telescopic rod shrinks with temperature decreases. This compensates for drift of the central wavelength of the athermal arrayed waveguide grating wavelength division multiplexer with temperature variation and increases a temperature range of the athermal arrayed waveguide grating wavelength division multiplexer.

While this specification contains many specific implementation details, these should not be construed as limitations on the scope of any invention or on the scope of what may be claimed, but rather as descriptions of features that may be specific to particular embodiments of particular inventions. For example, the telescopic rod of the sliding component can be made from non-metal material which is relatively high in linear thermal expansion coefficient, such as rubber and the like; or the deflection limiting piece is fixed on the telescopic rod through rivet or fixing pieces in other forms; the alterations can achieve the purpose of the present invention as well. Additionally, different materials can be used in the base board as well as different shapes and quantities of the deflection limiting pieces.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An athermal arrayed waveguide grating wavelength division multiplexer, comprising:
    a base board including an arrayed waveguide grating chip, the arrayed waveguide grating chip having a planar substrate on which an input optical waveguide, an input slab waveguide, a plurality of strip waveguides, an output slab waveguide and multiple output optical waveguides are sequentially coupled, and wherein the base board and the arrayed waveguide grating chip are divided into a first portion and a second portion through at least one division plane, wherein the division plane runs through at least one of the input slab waveguide and the output slab waveguide; and
    a sliding deflection component positioned on the base board, the sliding deflection component including a first end and a second end which are respectively fixed on the first portion and the second portion, the sliding deflection component including:
        a telescopic rod having a length that changes with temperature variation,
        a first sidewall of a first fixing piece and a second sidewall of a second fixing piece, the first sidewall and the second sidewall positioned at two ends of the telescopic rod, respectively, and
        a first deflection limiting piece fixed on one side of the telescopic rod such that a clearance is formed between at least one portion of a first end face of the first deflection limiting piece and an inner surface of the first sidewall of the telescopic rod, wherein the first end face of the first deflection limiting piece is shaped to cause the first and second fixing pieces to rotate relative to each other as a temperature change occurs across a range.

2. The athermal arrayed waveguide grating wavelength division multiplexer of claim 1, wherein the first end face of the first deflection limiting piece is a plane and an included angle formed between the first end face and the inner surface of the first sidewall is an acute angle.

3. The athermal arrayed waveguide grating wavelength division multiplexer of claim 1, wherein the first end face of the first deflection limiting piece is a cambered surface and one portion of the cambered surface abuts on the inner surface of the first sidewall.

4. The athermal arrayed waveguide grating wavelength division multiplexer of claim 1, wherein the first end face of the first deflection limiting piece is a cambered surface and the cambered surface is disposed separately from the inner surface of the first sidewall.

5. The athermal arrayed waveguide grating wavelength division multiplexer of claim 1, wherein a thermal expansion coefficient of the first deflection limiting piece is less than that of the telescopic rod.

6. The athermal arrayed waveguide grating wavelength division multiplexer of claim 1, comprising:
    a second deflection limiting piece fixed on the other side of the telescopic rod such that a clearance is formed between at least one portion of the first end face and the inner surface of the first sidewall of the telescopic rod.

7. The athermal arrayed waveguide grating wavelength division multiplexer of claim 6, wherein a distance of the clearance formed between the first end face of the second deflection limiting piece and the inner surface of the first sidewall of the telescopic rod is more than a distance of the clearance formed between the first end face of the first deflection limiting piece and the inner surface of the first sidewall of the telescopic rod.

8. The athermal arrayed waveguide grating wavelength division multiplexer of claim 6, wherein thermal expansion coefficients of the first deflection limiting piece and the second deflection limiting piece are less than a thermal expansion coefficient of the telescopic rod.

9. The athermal arrayed waveguide grating wavelength division multiplexer of claim 8, wherein thermal expansion coefficients of the first deflection limiting piece and the second deflection limiting piece are identical.

10. The athermal arrayed waveguide grating wavelength division multiplexer of claim 8, wherein the thermal expansion coefficient of the first deflection limiting piece is more than or less than the thermal expansion coefficient of the second deflection limiting piece.

* * * * *